May 25, 1926.
O. H. GOETZ
1,586,304
AUTOMOBILE BUMPER BRACKET
Filed July 30, 1924
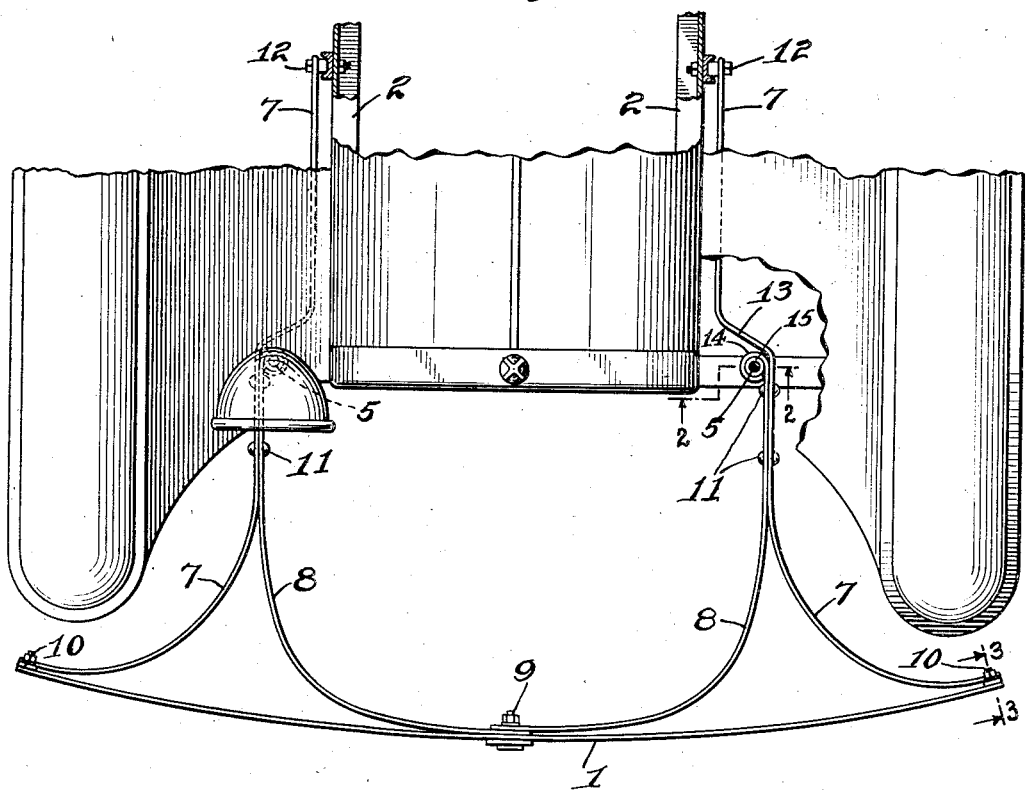
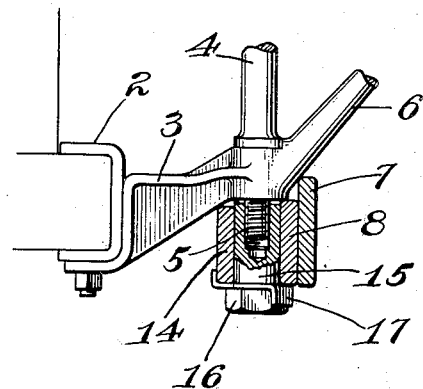
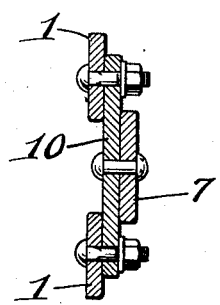
INVENTOR
Oscar H. Goetz
BY
John H. Hilliard
ATTORNEY Patented May 25, 1926.

1,586,304

UNITED STATES PATENT OFFICE.

OSCAR H. GOETZ, OF BRIDGEPORT, CONNECTICUT, ASSIGNOR TO AMERICAN CHAIN COMPANY, INC., A CORPORATION OF NEW YORK.

AUTOMOBILE BUMPER BRACKET.

Application filed July 30, 1924. Serial No. 729,031.

This invention relates to automobile bumpers, and particularly to the type of bumpers which derive their support partly from a connection with one or more of the conventional fender and lamp brackets in an automobile of the standard Ford type, the primary object of my invention being to provide a bumper having a simple, compact, and effective form of connection with the lamp-post carried by the aforesaid bracket, this connection comprising an eye, formed in a bumper bracket member, to embrace the downwardly extending threaded portion of the lamp-post below the lamp bracket, the eye being held in place there by a nut having a body portion to screw upon the threaded post, within the eye, this nut having a shoulder below the eye to sustain the weight of the bracket member and the bumper parts associated therewith.

Referring to the drawings:

Figure 1 is a fragmentary top view of the front of an automobile of the Ford type showing a bumper attached.

Figure 2 is a view in section on the line 2—2 of Figure 1.

Figure 3 is a section on the line 3—3.

In the illustrated embodment, the bumper 1 is shown in place upon the front of a standard Ford type of automobile having channel frame members 2 provided with conventional fender and lamp brackets 3 through which extend the usual lamp-posts 4, having threaded lower ends 5 projecting below the fender arm 6. The bumper 1 comprises a suitable impact-receiving member or members of which two are shown, arranged one above the other as illustrated in Figure 3. and these are supported by bumper-bracket members 7 and 8 arranged in pairs on each side of the front.

The outer ends of these bracket members are connected to the members 1 in spaced relation by suitable means, the members 8 being shown as bolted thereto at the midpoint 9, and the members 7 having a similar bolted connection 10 near the respective ends of the members 1, as shown in detail in Figure 3, which does not require particular description, as the form of this connection is not essential to the invention. The bracket members 7 and 8 of each pair are preferably brought together in substantially the shape illustrated and joined suitably, as by the rivets 11, one of these bracket-members being provided with a connection with the lamp-bracket post 5, in accordance with the invention, while the other bracket member is preferably extended past the lamp-bracket, on the outside thereof, and connected to the chassis at 12, constituting a stabilizer which may be advantageously offset at 13. In the form illustrated, the bracket member 8 is selected as convenient to provide with the improved connection for support of the bumper by the lamp-post on each side, on account of the advantages of space available, and in this form of connection the member 8 is provided with an eye 14 by bending its inner end around into position to embrace the threaded portion 5 of the lamp-post 4, from which the nut usually provided has been removed.

In its place, I prefer to provide special means to hold the bumper bracket 8 and lamp-post 4 in assembled relation with, and supported by, the lamp-post and fender-bracket, and as a convenient form of means for this purpose I have shown a nut having a body portion 15 to screw upon the post 5, fitting within the eye 14 of the bracket member 8, this nut having a shoulder 16 formed as part of its head and serving to support the weight of the bumper bracket member 8 and its associated bracket member 7 and the impact members 1. To hold this nut 15 in place a nut lock 17 may be supplied.

This attachment is cheap to manufacture, easy to install, and does not add to the number of parts, as the nut 15 replaces one usually provided.

Having thus described my invention, I claim:

1. An automobile bumper bracket of the type adapted to derive its support in part from a lamp-post extending from a fender bracket, said bumper bracket comprising a member having an eye to receive said post.

2. An automobile bumper bracket of the type adapted to derive its support in part from a lamp-post extending from a fender bracket, said bumper bracket comprising a member having an eye to receive said post and means to secure said eye to said post.

3. An automobile bumper bracket of the type adapted to derive its support in part from a lamp-post having a threaded portion extending from a fender bracket, said bumper bracket comprising a member having an eye to embrace said threaded post and a nut to secure said eye to said post.

4. An automobile bumper bracket of the type adapted to derive its support in part from a lamp-post having a threaded portion extending below a fender bracket, said bumper bracket comprising a member having an eye to embrace said threaded post and a nut having a body portion to screw upon said threaded post, within said eye, said nut having a shoulder to secure said eye to said post.

5. An automobile bumper bracket of the class adapted to derive its support in part from a lamp-post having a threaded portion extending below a fender bracket, said bumper bracket having a member provided with an eye to embrace said threaded post, and a nut upon said post to hold said bumper bracket and lamp-post in assembled relation with, and supported by, said fender bracket.

6. An automobile bumper bracket of the class adapted to derive its support in part from a fender bracket having a lamp-post extending therefrom, said bumper bracket comprising a plurality of members to be joined to the bumper in spaced relation and joined to each other adjacent to said fender bracket, one of said bracket-members having an eye to embrace said lamp-post, and another of said bracket-members having an extension rearward to be connected with the chassis, and means to secure said extension to said chassis and said eye to said post.

In witness whereof I have signed this specification.

OSCAR H. GOETZ.